United States Patent [19]

DeLancey

[11] 4,177,685

[45] Dec. 11, 1979

[54] PULLEY

[76] Inventor: Warren H. DeLancey, 1580 Prospect Ave., Elyria, Ohio 44035

[21] Appl. No.: 877,018

[22] Filed: Feb. 13, 1978

[51] Int. Cl.² .......................................... F16H 55/48
[52] U.S. Cl. ............................. 74/230.7; 403/362; 428/325
[58] Field of Search .............. 74/230.17 A, 230.17 B, 74/230.17 C, 230.01, 230.8, 230.3, 230.5, 230.7, 229, 214, 215, 216; 403/362, 366; 428/308, 325

[56] References Cited

U.S. PATENT DOCUMENTS

| | | | |
|---|---|---|---|
| 253,872 | 2/1882 | Klein | 74/230.3 |
| 662,048 | 11/1900 | Winter | 74/230.3 |
| 894,884 | 8/1908 | Hallowell | 403/362 |
| 895,409 | 8/1908 | Hallowell | 403/362 |
| 2,555,189 | 5/1951 | Fuchslocher | 74/230.13 C |
| 2,745,291 | 5/1956 | Michie | 74/230.17 C |
| 3,034,366 | 5/1962 | Tann | 74/230.17 C |
| 3,142,997 | 8/1964 | Rampe | 74/230.01 |
| 3,604,281 | 9/1971 | Shambaugh | 74/230.5 |
| 3,676,208 | 7/1972 | Griffin | 428/325 |
| 3,788,155 | 1/1974 | Cigala et al. | 74/230.01 |

FOREIGN PATENT DOCUMENTS

| | | | |
|---|---|---|---|
| 137549 | 9/1947 | Australia | 74/230.05 |
| 2328561 | 12/1973 | Fed. Rep. of Germany | 74/230.7 |
| 40586 | 11/1936 | Netherlands | 74/230.3 |

OTHER PUBLICATIONS

Plastics World Reprint, Dec. 1968, Successful 'Zero Reject' Program.
Plastics World Reprint, Apr. 15, 1974, Glass Microspheres– A New Era in Fillers.

*Primary Examiner*—Samuel Scott
*Assistant Examiner*—William R. Henderson
*Attorney, Agent, or Firm*—Watts, Hoffmann, Fisher & Heinke Co.

[57] ABSTRACT

A pulley having a molded glass bead reinforced plastic disk-like body with a central cylindrical aperture extending therethrough and a V-belt groove in its periphery or rim and a cylindrical hub extension projecting from one side, two square recesses in the outer circumference of the hub spaced ninety degrees (90°) apart with a cylindrical aperture extending from the bottom of each of the square recesses to the central cylindrical aperture of the pulley, squre nuts in the square apertures in the hub extension and a circular or ring-like metal band encircling the hub and overlying the nuts with apertures aligned with the threaded openings through the nuts.

An adjustable V-belt pulley comprising a first molded glass bead reinforced plastic member having a hub part with a central through aperture and a first annular flange part intermediate the ends of the hub part. One end of the hub part of the first member is externally threaded and has two external radial slots therein spaced one hundred and eighty degrees (180°) apart and the side of the flange adjacent thereto is tapered outwardly in the direction away from the threaded hub part. The hub part at the other side of the flange part is split and provided with aligned apertures for the reception of a bolt for clamping the first member upon a shaft. A counterweight is provided in na axial aperture opposite the clamping bolt to counterbalance the bolt. A second molded glass bead reinforced plastic member of the pulley is provided and forms between their beveled side a V-belt groove.

12 Claims, 9 Drawing Figures

PULLEY

BACKGROUND OF THE INVENTION

1. Field of the Invention

The invention relates to molded plastic pulleys.

2. Description of the Prior Art

Unreinforced plastics are relatively weak and pulleys made therefrom do not have significant use. Attempts have been made to manufacture glass fiber reinforced pulleys, but these pulleys have not met with appreciable commercial success. One principal difficulty which was experienced was excessive belt wear resulting from abrasion by the glass fibers. Prior efforts to overcome this difficulty have included facing the belt engaging surfaces of the pulleys with metal coverings, as disclosed, for example, in U.S. Pat. No. 3,142,997.

Another problem was conventionally made, reinforced plastic pulleys is that the material lacks sufficient shear strength to provide strong screw threads. This made attachment of the pulleys to mounting shafts more difficult than in the case of metal pulleys. It was also difficult to connect the mating halves of adjustable V-belt pulleys to each other.

SUMMARY OF THE INVENTION

The present invention provides a novel and improved pulley which can be inexpensively manufactured from readily available material and which comprises a plastic belt engaging surface having glass beads or spheres dispersed therein. The new pulley is relatively strong and highly resistant to wear and abrasion and will not cause undue deterioration of belts employed therewith.

The invention further provides a pulley of the character mentioned in the preceding paragraph having a molded plastic disk-like body with a central cylindrical through aperture, which aperture may be non-circular for mounting on a non-circular or a keyed shaft, a V-belt groove in the periphery or rim of the disk-like pulley body, a cylindrical hub extension projecting from one side of the disk-like body which hub extension has at least one extenal non-circular recess in its outer circumference, a cylindrical aperture extending from the bottom of the recess to the central through aperture of the pulley, a non-circular nut in the exterior recess or aperture in the hub extension and a band of metal or other suitable high tensile material encircling the hub extension and overlaying the nut and having an aperture therethrough aligned with the threaded aperture of the nut.

The invention further provides a pulley of the character referred to of the adjustable V-belt type comprising a first molded plastic drive member having a hub part with a central through aperture and a first annular flange part intermediate the ends of the hub part. One end of the hub part of the first drive member is externally threaded and has one or more external radial slots therein and the side of the flange adjacent thereto is tapered outwardly in the direction away from the threaded hub part. The other end of the hub part of the first drive member is split and provided with transversely extending aligned apettures for the reception of a bolt for clamping the hub onto a shaft. A counterweight is preferably provided in an aperture opposite the clamping bolt to counterbalance the bolt. A second one-piece molded drive member of the pulley comprises an internally threaded hub part threaded upon the threaded hub part of the first drive member and a flange part at the end of the hub part adjacent to the flange part of the first drive member and having the side thereof adjacent to the flange part of the first drive member beveled at the same angle but in the opposite direction as the bevel on the flange part of the first drive member whereby the two flange parts form between their beveled side a V-belt groove. The hub part of the second member has a threaded radial aperture therein for the reception of a threaded fastener selectively extendible into a radial slot in the externally threaded end of the hub part of the first drive member.

Further objects and advantages of the invention will be referred to in or become apparent from the following descriptions of the two preferred embodimens of the invention.

DESCRIPTION OF PEFERRED EMBODIMENTS

Figure 1:
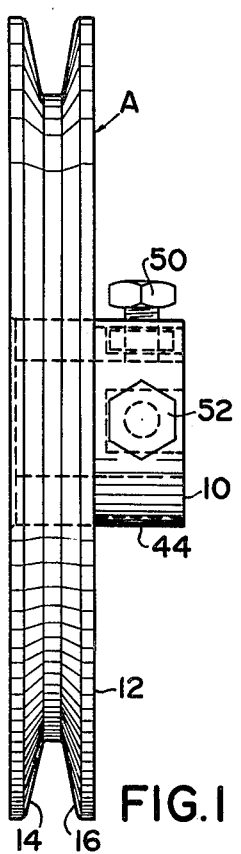
FIG. 1 is an elevational view of a V-belt pulley embodying the present invention.
Figure 2:
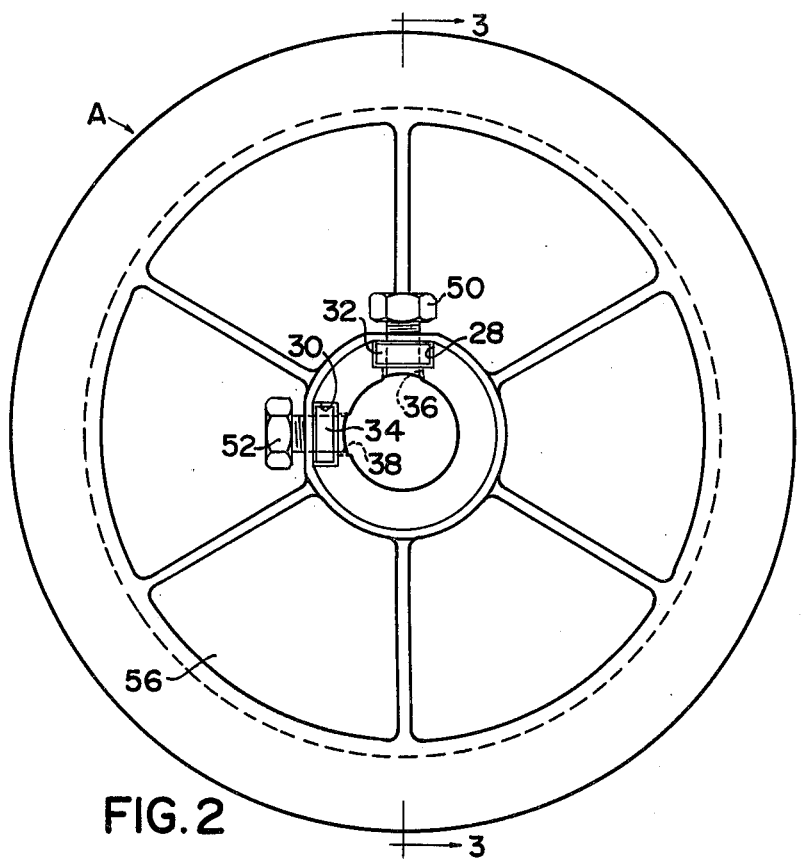
FIG. 2 is a side elevation of the pulley shown in FIG. 1 as viewed from the right of FIG. 1.
Figure 3:
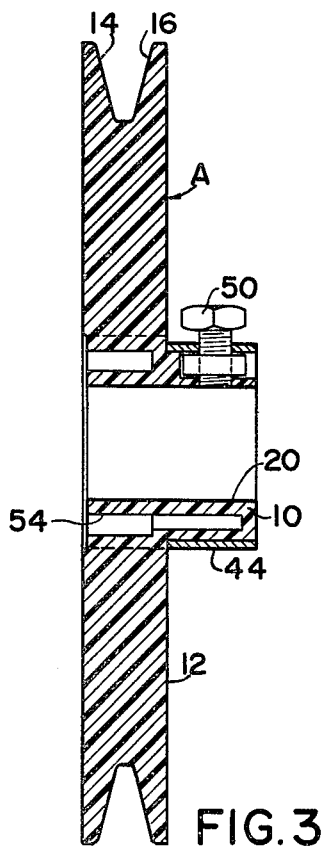
FIG. 3 is a sectional view, with parts in elevation, approximately on the line 3—3 of FIG. 2.
Figure 4:
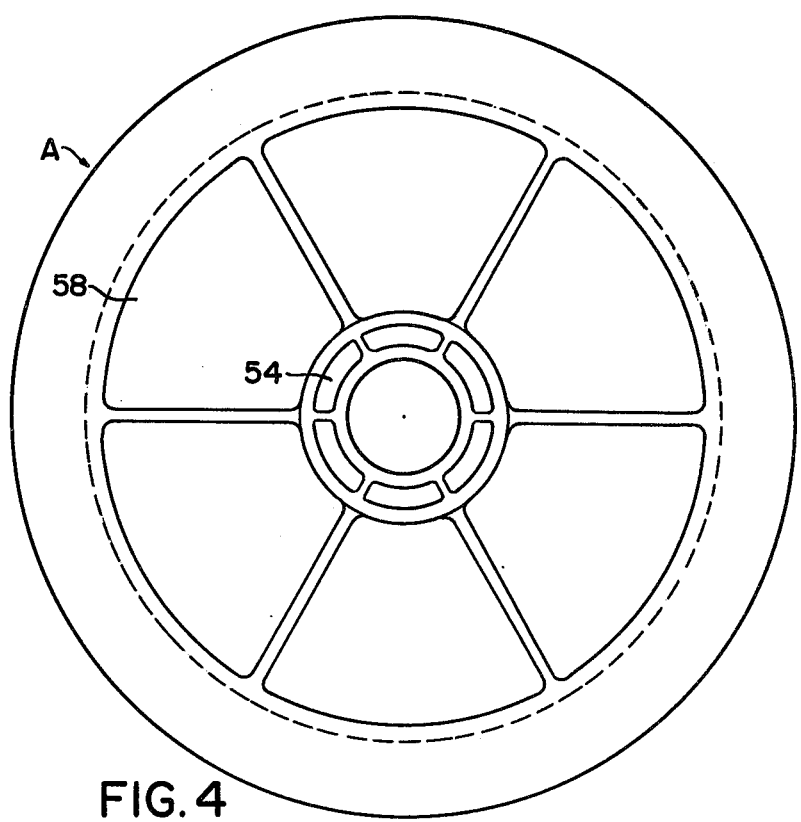
FIG. 4 is a side elevation of the pulley shown in FIG. 1 as viewed from the left of FIG. 1.

Referring to FIGS. 1 to 4 of the drawings the depicted pulley designated generally by the reference character A comprises a molded plastic disk-like member comprising a hub part 10 and a radial disk or flange part 12 with a radially outwardly facing V-groove having opposed or facing side surfaces 14, 16 for the reception of a V-belt of a power transmission. The hub 10 has a through axial aperture 20 for the reception of a shaft, either the drive or driven shaft of a power transmission. The hub part 10 extends axially to one side of the pulley proper and has two external non-circular apertures 28, 30 therein for the reception of non-circular nuts 32, 34, respectively. In the depicted pulley the apertures 28, 30 and the nuts 32, 34 are square. Cylindrical apertures 36, 38 having diameters slightly larger than the threaded apertures of the nuts 32, 34 connect the bottoms of the apertures 28, 30 with the through axial opening 20 in the hub 10. The exterior of the axially extending part of the hub 10 is encircled by a ring-like metal band 44 which fits rather snugly on the hub, overlies the nuts 32, 34 and has circular apertures therethrough in alignment with the threaded apertures of the nuts 32, 34.

The pulley A is adapted to be secured to a shaft extending into or through the axial aperture 20 in the hub 10 by threaded fasteners, such as, the screws 50, 52 threaded into the nuts 32, 34, respectively, and adapted to be jammed against the shaft. The screws 50, 52 extend through the apertures 36, 38 in the hub 10 and the apertures in the metal band 44 and the band takes the reaction forces produced by the jamming of the screws 50, 52 against the shaft. The band 44 which may be made of any suitable high tensile material places the hub part 10 of the pulley under compression and thus reinforces it. The screws 50, 52 are not threaded into the plastic part of the pulley.

Opposite sides of the hub and disk parts 10, 12, respectively, are provided with suitable cavities or recesses 54, 56, 58 to maintain a more or less uniform thickness throughout the parts for the purpose of facilitating their production by molding.

The combination hub part 10 and flange or disk part 12 of the pulley A is molded of a suitable plastic, such as nylon, reinforced by glass beads or spheres. The glass beads may comprise from about 10% to 60% by weight of the material of the molding and be of a size from about 4 microns (0.00016") to about 5000 microns (0.18") in diameter, preferably from about 750 microns (0.03") to about 1000 microns (0.04") depending upon the type of plastic employed and the service required of the pulley. Glass beads of mixed sizes may be used, for example, "Potters Size 3000" marketed by Potters Industries, Inc., Hasbrouck Heights, N. J., which include spheres from 4 microns (0.00016") to 44 microns (0.0017") with an average diameter of 25 microns (0.001"). In service any plastic covering the glass heads on the belt engaging surfaces 14, 16 of the pulley is quickly worn away leaving a belt engaging surface composed largely of glass beads or spheres which surface has high resistance to abrasion, is long wearing, and has minimal detrimental effects upon belts used therewith.

Figure 5:
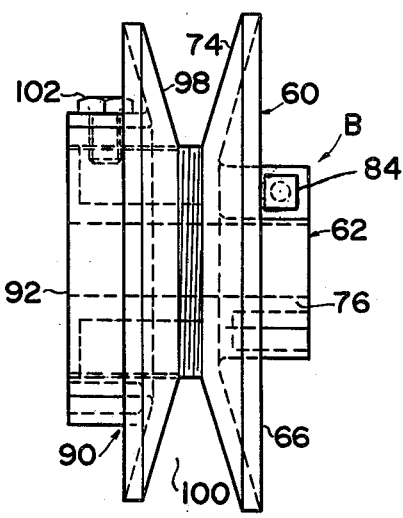
FIG. 5 is an elevational view of an adjustable V-belt pulley embodying the present invention.
Figure 6:
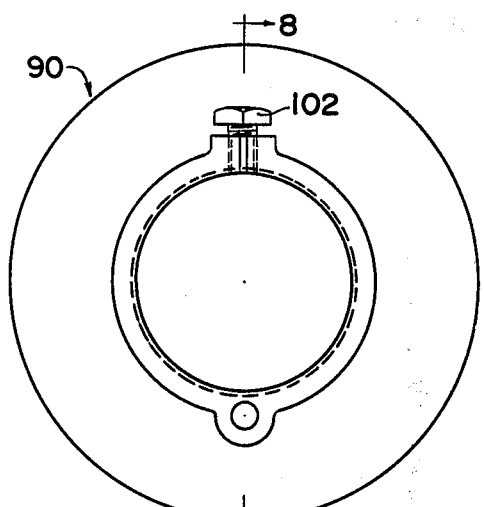
FIG. 6 is a side elevation of one-half of the pulley shown in FIG. 5 as viewed from the left of FIG. 5.
Figure 7:
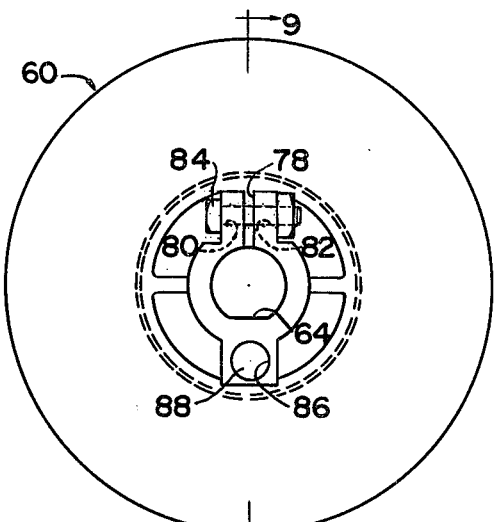
FIG. 7 is a side elevation of the other half of the pulley shown in FIG. 5 as viewed from the right of FIG. 5.
Figure 8:
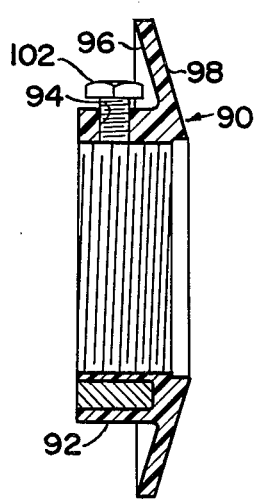
FIG. 8 is a sectional view approximately on the line 8—8 of FIG. 6.
Figure 9:
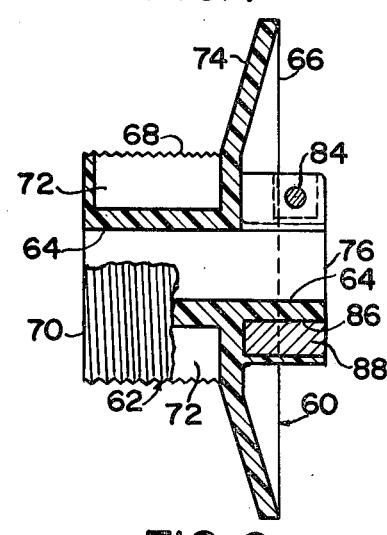
FIG. 9 is a sectional view with parts in elevation approximately on the line 9—9 of FIG. 7.

Referring to FIGS. 5 to 9 of the drawings the pulley depicted therein is a V-belt pulley, designated generally by the reference character B, of the adjustable or variable diameter type. The pulley B comprises a one-piece molded member 60 having a hub part 62 with a central through opening 64 for mounting the member on a shaft and a radial flange 66 intermediate the end of the hub part. One end 68 of the hub part 62 of the member 60 is provided with an external thread 70 and with one or more external radial apertures 72. In the depicted pulley B two diametrically opposite grooves 72 are employed. The side 74 of the flange 66 adjacent to the threaded end 68 of the hub part 62 is tapered outwardly and in the direction away from the threaded hub part. The other end 76 of the hub part 62 of the member 60 is split as at 78 and provided with aligned apertures 80, 82 through which a bolt 84 is inserted for clamping the hub part 62 onto a shaft. An axial extending aperture 86 is provided in the end of the hub part 76 diametrically opposite to the split 78 for the reception of a counterweight 88 to balance the bolt 84.

A one-piece molded second member 90 having an internally threaded hub part 92 is threaded onto the externally threaded end 68 of the hub part 62 of the member 60. The hub part 92 of the member 90 has a radial extending threaded through aperture 94 and a radial flange 96 at the end of the hub part adjacent to the flange part 66 of the member 60. The side 98 of the flange 96 adjacent to the flange part 66 of the member 60 is beveled at the same angle as the side of the flange part 66 adjacent thereto but in the opposite direction as that of the flange part 66 of the member 60 so that the two flange parts 66, 96 form between them a V-belt groove 100. A preferably metal screw 102 threaded into the aperture 94 of the hub part 92 of the member 90 extends into one of the aperture 72 in the externally threaded end 68 of the hub part 62 of the member 60. The threads in the plastic hub part 92 engaged by the screw 102 are not subjected to shear loading as the end of the screw 102 does not abut the bottom of the groove 72. The width of the V-groove 100 can be varied or adjusted by removing the threaded fastener 102 from the groove 72 in the member 60 and rotating the members 60, 90 relative to one another.

The members 60 and 90 are preferably made of reinforced plastic similar to the plastic described with respect to the pulley A shown in FIGS. 1 to 4. If desired merely the adjacent sides 74, 98 of the flange parts of the members 60 and 90 which form the V-belt groove may have glass beads or spheres embedded therein. The glass beads or spheres may be coated for better adherence to the plastic, if desired. Such coated beads are readily available commercially.

The improved performance of the new pulley of the present invention was demonstated under adverse test conditions of repeated starts and stops of a 12 inch scirocco blower wheel driven by a one-half horsepower high starting torque capacitor start electric motor. In comparative tests, an unreinforced nylon pulley showed define grooves after 20,000 starts and stops. There was no apparent wear on the belt. When using a pulley made of nylon reinforced with 25% of glass fibers, the pulley did not show wear after 25,000 starts and stops, but the belt was noticeably frayed. When the nylon was mixed with 40% glass beads (0.001 to 0.015 inches diameter) according to this invention, both the pulley and the belt showed only negligible wear after 400,000 starts and stops which is the equivalent to an estimated 25 years of service as an air conditioning blower.

From the foregoing description of the preferred embodiments of the invention disclosed herein it will be evident that there has been provied a novel and improved V-belt pulley made of plasstic, at least the V-belt grooves of which are reinforced with glass beads or spheres. The pulleys are inexpensive to manufacture from readily available material and is not subject to deterioration due to wear etc. caused by the belts used therewith and which pulleys do not have a detrimental effect on the belts.

While two preferred embodiments of the invention have been described in considerable detail, it will be apparent that the invention can be incorporated in pulleys of other constructions both V-belt and flat belt types, and it is the intention to hereby cover all pulleys incorporating the present invention as defined by the appended claims.

What is claimed is:

1. A pulley comprising a plastic belt engaging surface having glass beads or spheres dispersed therein for reducing pulley and belt wear.

2. A pulley as claimed in claim 1 in which the glass beads or spears comprise about 10% to 60% of the surface.

3. A pulley comprising a molded plastic pulley body having a belt engaging surface with glass beads or spheres dispersed therein for reducing pulley and belt wear.

4. A pulley comprising a disk-like body part with a V-belt groove in its periphery or rim and a hub part extending from at least one side of said body part and having at least one external non-circular recess therein, said hub part having a shaft receiving aperture therein concentric with the V-groove in said body part and an aperture extending from the bottom of said recess or recesses to said shaft receiving aperture, non-circular nuts in the non-circular aperture or apertures in said hub part, and a ring or band member encircling said hub part and having an aperture or apertures therein aligned with the threaded aperture or apertures in the nut or nuts, said body and hub parts being made of a plastic and having at least the sides of the V-belt groove reinforced with glass beads or spheres for reducing pulley and belt wear.

5. A pulley as claimed in claim 4 in which the disk-like body and hub parts are made of plastic containing from about 10% to 60% glass beads or spheres between about 4 microns to about 5000 microns in diameter.

6. A pulley as claimed in claim 4 in which the disk-like body and hub parts are made of plastic containing about 40% glass beads or spheres between about 750 microns to about 1000 microns in diameter.

7. A variable diameter V-belt pulley comprising: a first member having a hub part with a central through opening for mounting said member on a shaft and a radial flange intermediate the end of the hub part, one end of said hub part of said first member being externally threaded and provided with an external axially extending aperture, said flange having its side adjacent said threaded hub pat tapered outwardly and in the direction away from said threaded hub part, the other end of said hub part of said first drive member being split and provided with aligned apertures, a bolt extending through said aligned apertures in said split end of said hub part for clamping said hub part onto a shaft, second member comprising an internally threaded hub part threaded onto said externally threaded end of said hub part of said first drive member and having a radially extending threaded through aperture and a flange at the end of said hub part adjacent to said flange part of said first member and having the side thereof adjacent to said flange part of said first member beveled at the same angle part of said first member beveled at the same angle but in the opposite direction as that of said flange part of said first member whereby the two flange parts form between them a V-belt groove, and a threaded fastener threaded into said threaded radial aperture of said hub part of said second member and extending into said external aperture in said threaded end of said hub part of said first member, said first and second members being formed of plastic having at least the sides of the V-belt groove formed thereby reinforced with glass beads or spheres for reducing pulley and belt wear.

8. A variable diameter V-belt pulley as claimed in claim 7 wherein the fist and second members are made of plastic containing from about 10% to 60% glass beads or spheres from about 4 microns to 5000 microns in diameter.

9. A variable diameter V-belt pulley as claimed on claim 8 wherein the first and second members are made of plastic containing about 40% glass beads or spheres from about 750 microns to about 1000 microns in diameter.

10. A variable diametr V-belt pulley comprising: a first member having a hub part with a central through opening for mounting said member on a shaft and a radial flange intermediate the end of the hub part, one end of said hub part of said first member being externally threaded and provided with an external axialy extending radial aperture, said flange having its side adjacent said threaded hub part tapered outwardly and in the direction away from said threaded hub part, the other end of said hub part of said first member being split and provided with aligned apertures, a bolt extending through said aligned apertures in said split end of said hub part for clamping said hub part onto a shaft, an aperture in said other end of said hub part diametrically opposite to said split in said other end of said hub part, a counterweight in said aperture, a second member comprising an internally threaded hub part threaded onto said externally threaded end of said hub part of said first drive member and having a threaded radially extending through aperture and a flange at the end of said hub part adjacent to said flange part of said first member and having the side thereof adjacent to said flange part of said first member beveled at the same angle but in the opposite direction as that of said flange part of said first member wherein the two flange parts form between them a V-belt groove, and a threaded fastener threaded into said threaded aperture of said hub part of said second member and extending into said external aperture in said threaded end of said hub part of said first member, said first and second members being formed of plastic having at least the sides of the V-belt groove formed thereby reinforced with glass beads or spheres for reducing pulley and belt wear.

11. A variable diameter V-belt pulley as claimed in claim 10 wherein the first and second members are made of plastic containing from bout 10% to 60% glass beads or spheres from about 4 microns to 5000 microns in diameter.

12. A variable diameter V-belt pulley as claimed in claim 10 wherein the first and second membes are made of plastic containing about 40% glass beads or spheres from about 750 microns to about 1000 microns in diameter.

* * * * *

UNITED STATES PATENT AND TRADEMARK OFFICE
CERTIFICATE OF CORRECTION

PATENT NO. : 4,177,685

DATED : December 11, 1979

INVENTOR(S) : Warren H. DeLancey

It is certified that error appears in the above-identified patent and that said Letters Patent are hereby corrected as shown below:

In the Abstract, line 9, "squre" should be --square--;
Column 1, line 18, "was" should be --with--; line 62, "apettures" should be --apertures--;
Column 2, line 14, "embodimens" should be --embodiments--;
Column 4, line 24, "define" should be --definite--; line 36, "provied" should be --provided--; line 37, "plasstic" should be --plastic--;
Column 5, line 25, "pat" should be --part--;
Column 6, line 3, "on" should be --in--; line 8, "diametr" should be --diameter--; line 32, "wherein" should be --whereby--.

Signed and Sealed this

Twenty-second Day of April 1980

[SEAL]

Attest:

SIDNEY A. DIAMOND

Attesting Officer

Commissioner of Patents and Trademarks